United States Patent
Kao et al.

(10) Patent No.: US 9,201,529 B2
(45) Date of Patent: Dec. 1, 2015

(54) TOUCH SENSING METHOD AND PORTABLE ELECTRONIC APPARATUS

(71) Applicant: HTC Corporation, Taoyuan, Taoyuan County (TW)

(72) Inventors: Yih-Feng Kao, Taoyuan (TW); Ming-Yu Chen, Taoyuan (TW); Chin-Chung Shih, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 81 days.

(21) Appl. No.: 13/680,190

(22) Filed: Nov. 19, 2012

(65) Prior Publication Data

US 2014/0139443 A1    May 22, 2014

(51) Int. Cl.
| | |
|---|---|
| G06F 3/041 | (2006.01) |
| G06F 3/042 | (2006.01) |
| G06F 3/043 | (2006.01) |
| G06F 3/044 | (2006.01) |
| G06F 3/045 | (2006.01) |
| G06F 3/046 | (2006.01) |
| G06F 3/047 | (2006.01) |
| G06F 3/048 | (2013.01) |
| G06F 9/44 | (2006.01) |
| G06F 3/0484 | (2013.01) |

(52) U.S. Cl.
CPC ............ *G06F 3/041* (2013.01); *G06F 3/04842* (2013.01); *G06F 9/4443* (2013.01); *G06F 2203/04105* (2013.01)

(58) Field of Classification Search
CPC ..... G06F 3/041; G06F 3/0412; G06F 3/0414; G06F 3/0416; G06F 3/042; G06F 3/0421; G06F 3/0423; G06F 3/0425; G06F 3/0426; G06F 3/0428; G06F 3/043; G06F 3/0433; G06F 3/0436; G06F 3/044; G06F 3/045; G06F 3/046; G06F 3/047; G06F 3/048; G06F 3/0481; G06F 3/0484; G06F 3/04842; G06F 3/0488; G06F 3/04886; G06F 2203/04106
USPC ................................ 345/156, 157, 173–178; 178/18.01–20.04; 715/700–866
See application file for complete search history.

(56) References Cited

U.S. PATENT DOCUMENTS 6,492,978 B1 *    12/2002    Selig et al. .................... 345/173
7,841,944 B2 *    11/2010    Wells ............................. 463/37

(Continued)

FOREIGN PATENT DOCUMENTS

WO    2012/149911    11/2012

OTHER PUBLICATIONS

Taiwan Office Action dated Sep. 15, 2014.

*Primary Examiner* — Ilana Spar
(74) *Attorney, Agent, or Firm* — McClure, Qualey & Rodack, LLP

(57) ABSTRACT

A touch sensing method and a portable electronic apparatus are disclosed in this invention. The portable electronic apparatus includes a display module, a touch module and a processing unit. The display module is used for displaying a user interface. The user interface includes a plurality of interface layers. Each of the interface layers has a layer depth index respectively. The touch module is used for sensing a touch input. The processing unit is used for mapping the touch input to one of the interface layers according to the touch input and the layer depth indices of the interface layers, so as to select or execute an application function on the one of the interface layers.

16 Claims, 4 Drawing Sheets

(56) References Cited

U.S. PATENT DOCUMENTS

| | | | |
|---|---|---|---|
| 2011/0083106 A1* | 4/2011 | Hamagishi | 715/836 |
| 2011/0102340 A1 | 5/2011 | Martin et al. | |
| 2012/0034978 A1* | 2/2012 | Lim | 463/36 |
| 2013/0314364 A1* | 11/2013 | Nicholson et al. | 345/174 |

* cited by examiner

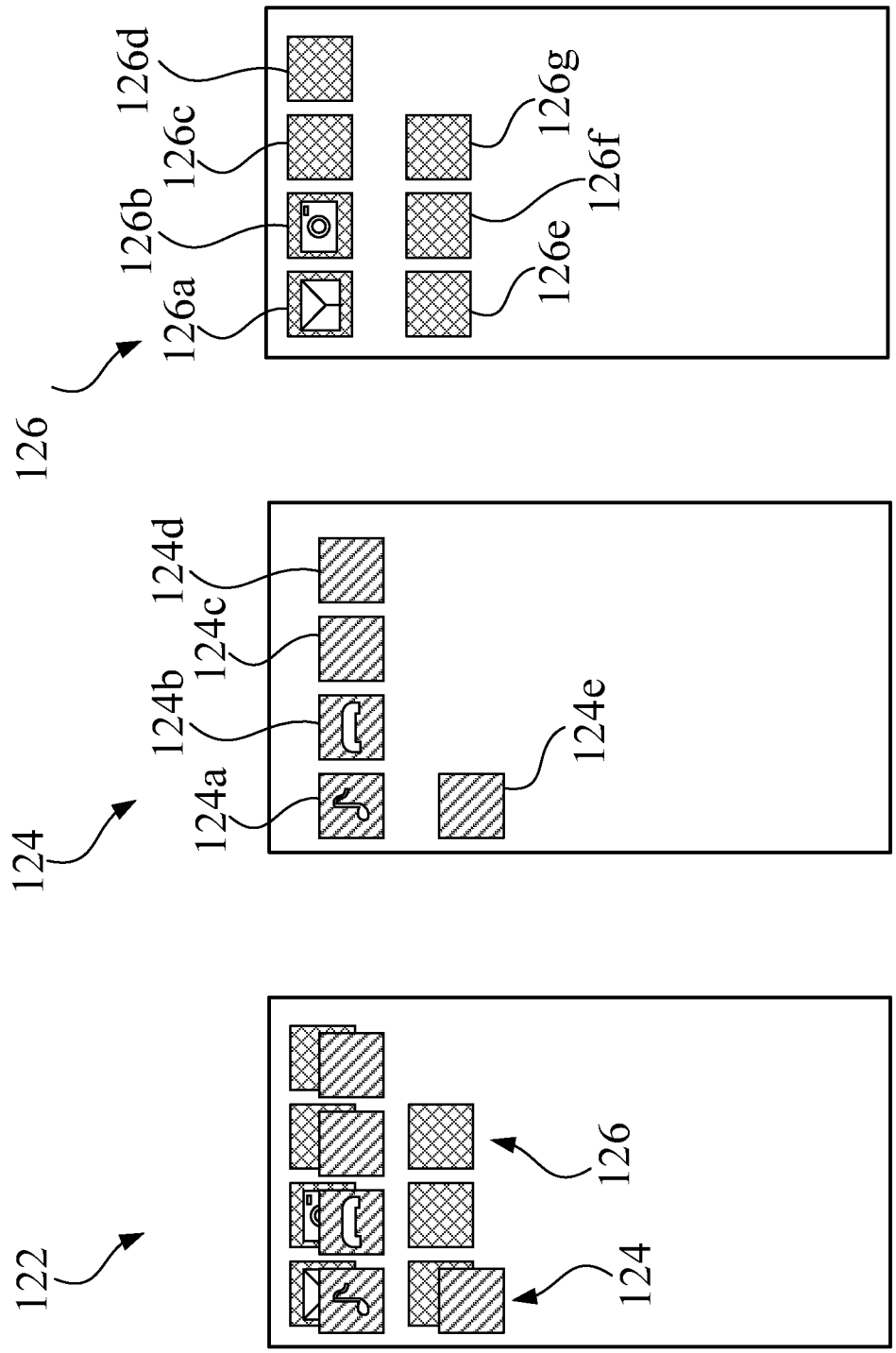

TOUCH SENSING METHOD AND PORTABLE ELECTRONIC APPARATUS

BACKGROUND

1. Field of Invention

The present invention relates to a touch sensing method a touch device. More particularly, the present invention relates to a touch sensing method and a portable electronic apparatus applying the touch sensing method.

2. Description of Related Art

Touch panel devices, easy to manipulate, fast in response time, and compact in size, may provide intuitive and convenient interfaces to users, such that the touch panel devices become important as input interfaces and widespread in various applications of consumer electronics, e.g., e-book, personal digital assistant (PDA), smart phone, laptop computer, point of sale (POS) system.

In general, a touch panel is consisted of a display panel and a touch module disposed on the display panel. A transparent touch sensor film is adhered on the display panel, so as to realize touch sensing and display functions at the same time. Because of recent improvements made in the sensing precision of the aforesaid touch-sensing equipment, the modern touch panel is now popular among users, and it is gradually replacing traditional input devices, e.g., keyboards and mouse devices, in many systems.

Currently, a Graphical User Interface (GUI) is typically used as the user interface in a touch panel. There are several objects, e.g., functional shortcuts or Widgets, displayed on the desktop of the Graphical User Interface.

The objects displayed on the desktop are distributed on different spots in two dimensions over the screen. When a user touches the touch sensor module, a touch input with a horizontal coordinate and a vertical coordinate is induced. On the basis of the horizontal coordinate and the vertical coordinate of the touch input, a corresponding object on the user interface can be selected or an application function of the object can be executed.

Each icon of displayed objects on the screen requires a basic size, such that functions and contents representing by the icon can be recognized easily by users. However, the screen size of an electronic device is limited. When there are many objects to be displayed (e.g., dozens of Widget items with different functions are installed), the objects may be displayed in several different pages on a traditional device. The manipulation on a traditional device is inconvenient that users must find out which page the wanted objects is located on before they can select those objects.

SUMMARY

In order to solve the aforesaid problem, this disclosure provides a touch sensing method and a portable electronic apparatus. The user interface provided by the portable electronic apparatus in the disclosure has multiple interface layers in the same screen. Multiple display items on the user interface may be distributed on different locations in two dimensions over the screen, and in the mean time, each display item belongs to one of the interface layers, such that a three-dimensional user interface is formed. When users trigger the touch sensor module to generate a touch input, a depth coordinate of the touch input can be analyzed in this disclosure. The touch input can be mapped onto one of the interface layer according to the depth coordinate. Therefore, the disclosure may provide user a succinct interface with more manipulation possibilities compared to traditional two-dimensional user interface.

Therefore, an aspect of the invention is to provide a touch sensing method. The touch sensing method includes steps of: providing a user interface comprising a plurality of interface layers, each of the interface layers has a layer-depth reference respectively; sensing a touch input; and, mapping the touch input onto one of the interface layers according to the touch input and the layer-depth references of the interface layers, so as to select or launch an executive function from the one of the interface layers.

According to an embodiment of the disclosure, the touch sensing method is suitable for a portable electronic apparatus, the portable electronic apparatus comprises a plurality of touch sensors, and the step of sensing a touch input further includes a step of: generating a depth coordinate when the touch input being sensed by one of the touch sensors, the depth coordinate being varied according to the touch input being sensed by different touch sensor of the touch sensors. Furthermore, the step of mapping the touch input onto one of the interface layers further includes a step of: matching the depth coordinate of the touch input with the layer-depth references of the interface layers, and mapping the touch input onto the one of the interface layers according to the matching result.

In aforesaid embodiment of the disclosure, the touch sensors may include a first touch sensor and a second touch sensor. The interface layers may include a front interface layer and a back interface layer. When the first touch sensor senses user manipulation and generates the touch input, the touch input is mapped onto the front interface layer for selecting or executing an executive function from the front interface layer. When the second touch sensor senses user manipulation and generates the touch input, the touch input is mapped onto the back interface layer for selecting or executing an executive function from the back interface layer.

In aforesaid embodiment of the disclosure, the first touch sensor may include a capacitive touch sensor, a resistive touch sensor, an optical touch sensor or an acoustic touch sensor. The second touch sensor may include an acoustic touch sensor.

According to an embodiment of the disclosure, the touch sensing method is suitable for a portable electronic apparatus, the portable electronic apparatus comprises at least one touch sensor, and the step of sensing a touch input further includes a step of: analyzing a pressed force, a vertical pressed amplitude or a signal strength from the touch input, and accordingly generating a depth coordinate corresponding to the touch input. Furthermore, the step of mapping the touch input onto one of the interface layers further include a step of: matching the depth coordinate of the touch input with the layer-depth references of the interface layers, and mapping the touch input onto one of the interface layers according to the matching result.

In aforesaid embodiment of the disclosure, the at least one touch sensor comprises a capacitive touch sensor.

According to an embodiment of the disclosure, the touch input further has a horizontal coordinate and a vertical coordinate.

According to an embodiment of the disclosure, the user interface includes a plurality of display items. Each display item is located on one of the interface layers. When at least part of the display items from different interface layers are overlapped, the display items are displayed in sequence of the layer-depth references of the interface layers.

Another aspect of the invention is to provide a portable electronic apparatus includes a display module, a touch sensor module and a processing unit. The display module is used for displaying a user interface. The user interface includes a plurality of interface layers. Each of the interface layers has a layer-depth reference respectively. The touch sensor module is used for sensing a touch input. The processing unit is used for mapping the touch input onto one of the interface layers according to the touch input and the layer-depth references of the interface layers, so as to select or launch an executive function from the one of the interface layers.

According to an embodiment of the disclosure, the touch sensor module includes a plurality of touch sensors. A depth coordinate is generated when the touch input is sensed by one of the touch sensors. The depth coordinate is varied according to the touch input being sensed by different touch sensor of the touch sensors. The processing unit matches the depth coordinate of the touch input with the layer-depth references of the interface layers, and the processing unit maps the touch input onto the one of the interface layers according to the matching result.

In aforesaid embodiment of the disclosure, the touch sensors include a first touch sensor and a second touch sensor. The interface layers include a front interface layer and a back interface layer. When the first touch sensor senses user manipulation and generates the touch input, the touch input is mapped onto the front interface layer for selecting or executing an executive function from the front interface layer. When the second touch sensor senses user manipulation and generates the touch input, the touch input is mapped onto the back interface layer for selecting or executing an executive function from the back interface layer.

In aforesaid embodiment of the disclosure, wherein the first touch sensor may include a capacitive touch sensor, a resistive touch sensor, an optical touch sensor or an acoustic touch sensor. The second touch sensor may include an acoustic touch sensor.

According to an embodiment of the disclosure, the touch sensor module includes at least one touch sensor. The processing unit analyzes pressed force, vertical pressed amplitude or signal strength from the touch input, and accordingly the processing unit generates a depth coordinate corresponding to the touch input. The processing unit matches the depth coordinate of the touch input with the layer-depth references of the interface layers, and the processing unit maps the touch input onto one of the interface layers according to the matching result.

In aforesaid embodiment of the disclosure, the at least one touch sensor includes a capacitive touch sensor.

According to an embodiment of the disclosure, the touch input further has a horizontal coordinate and a vertical coordinate.

According to an embodiment of the disclosure, the user interface includes a plurality of display items. Each display item is located on one of the interface layers. When at least part of the display items from different interface layers are overlapped, the portable electronic apparatus displays the display items in sequence of the layer-depth references of the interface layers.

Another aspect of the invention is to provide a portable electronic apparatus, which includes a casing, a display module, a touch sensor module and a processing unit. The display module is used for displaying a user interface. The user interface includes a front interface layer and a back interface layer. The touch sensor module is used for sensing a touch input. The touch sensor module includes a first touch sensor disposed on a front side of the casing and a second touch sensor disposed on a back side of the casing. When the first touch sensor senses user manipulation and generates the touch input, the processing unit maps the touch input onto the front interface layer for selecting or executing an executive function from the front interface layer. When the second touch sensor senses user manipulation and generates the touch input, the processing unit maps the touch input onto the back interface layer for selecting or executing an executive function from the back interface layer.

According to an embodiment of the disclosure, the first touch sensor may include a capacitive touch sensor, a resistive touch sensor, an optical touch sensor or an acoustic touch sensor. The second touch sensor may include an acoustic touch sensor.

BRIEF DESCRIPTION OF THE DRAWINGS

The invention can be more fully understood by reading the following detailed description of the embodiments, with reference made to the accompanying drawings as follows:

FIG. 3 is a schematic diagram illustrating the user interface according to an embodiment of the invention;

FIG. 4 is a schematic diagram illustrating the front interface layer according to aforesaid embodiment of the invention;

FIG. 5 is a schematic diagram illustrating the back interface layer according to aforesaid embodiment of the invention.

DETAILED DESCRIPTION

Figure 1:
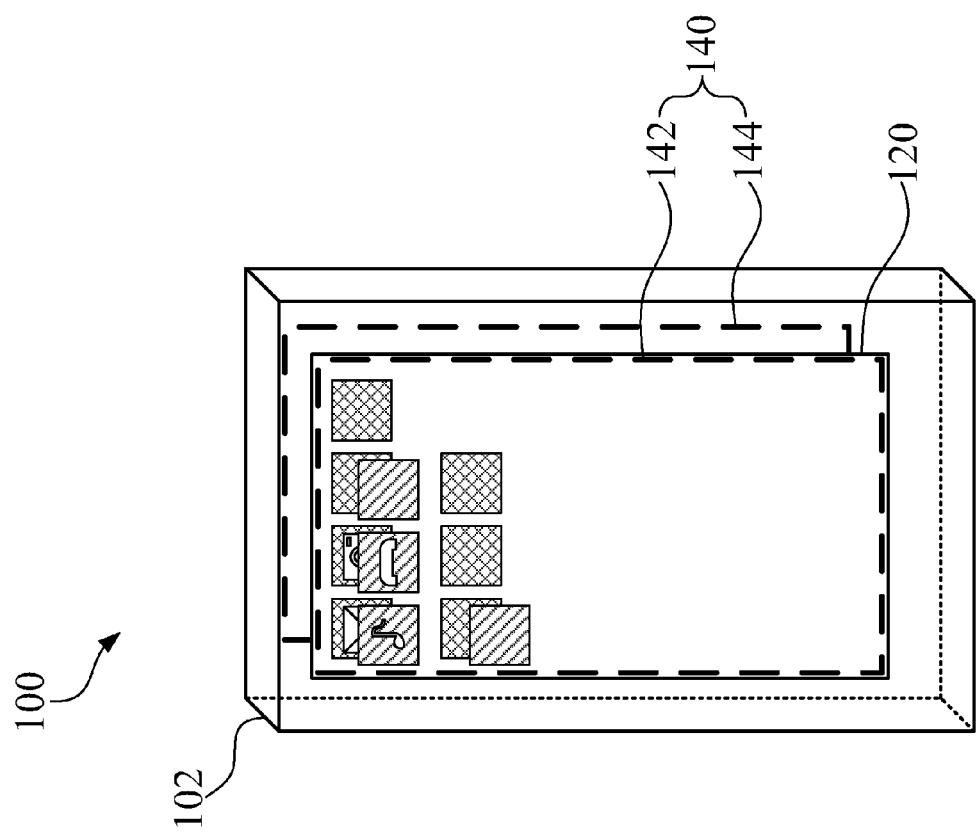
FIG. 1 is a perspective view diagram illustrating a portable electronic apparatus according to an embodiment of the invention.
Figure 2:
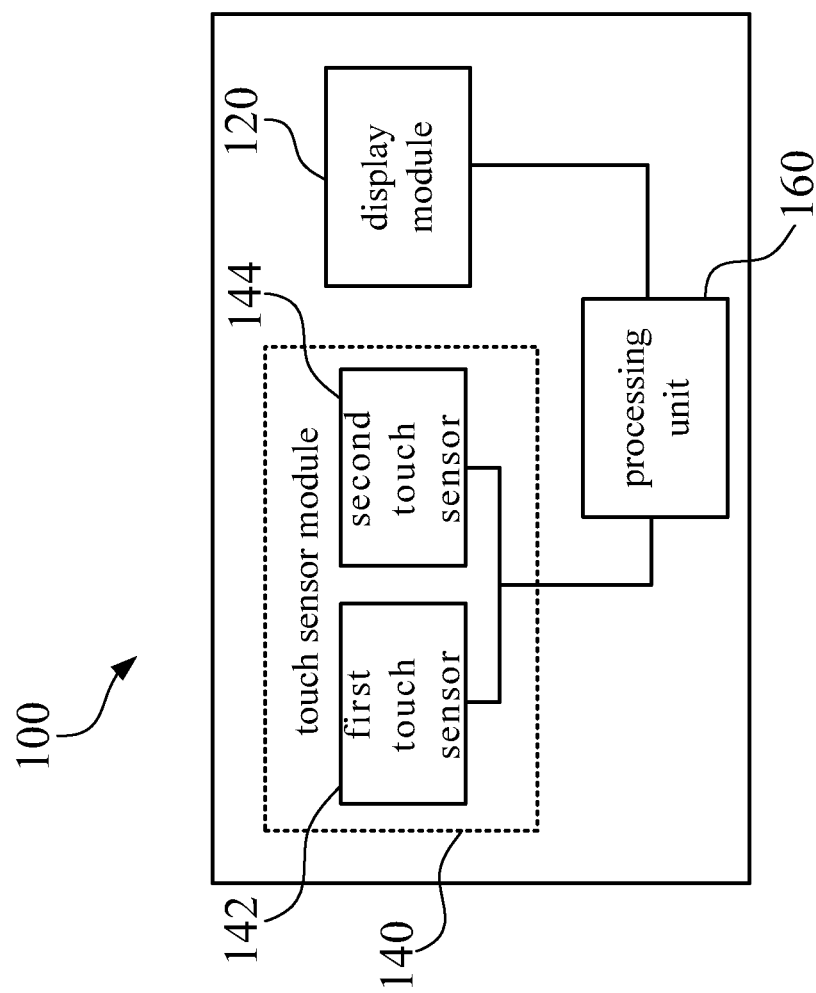
FIG. 2 is a functional block diagram illustrating the portable electronic apparatus in FIG. 1.

Reference is made to FIG. 1 and FIG. 2. FIG. 1 is a perspective view diagram illustrating a portable electronic apparatus 100 according to an embodiment of the invention. FIG. 2 is a functional block diagram illustrating the portable electronic apparatus 100 in FIG. 1.

As shown in FIG. 2, the portable electronic apparatus 100 in the embodiment includes a display module 120, a touch sensor module 140 and a processing unit 160. As shown in FIG. 1, the display module 120 is disposed on the casing 102 of the portable electronic apparatus 100. In the embodiment, the touch sensor module 140 may include two touch sensors (a first touch sensor 142 and a second touch sensor 144). Furthermore in the embodiment, the first touch sensor 142 is closely adjacent to the display module 120 and located on the front side of the casing 102. The second touch sensor 144 is approximately symmetric to the first touch sensor 142 and located on the back side of the casing 102. However, the invention is not limited to have two touch sensors on the opposite surfaces.

When a user contacts the detecting plane of the first touch sensor 142 or the second touch sensor 144 with a contact medium (e.g., fingers or stylus), the touch sensor module 140 utilizes the first touch sensor 142 or the second touch sensor 144 to generate a touch input. When information contents of the touch input may include a horizontal coordinate, a vertical coordinate and a depth coordinate. Among these coordinates, the horizontal coordinate and the vertical coordinate represent the horizontal and vertical location of the sensed point, induced by the contact of the user, relative to the detecting plane. Furthermore in the embodiment, the depth coordinate of the touch input represents the contact of the user is detected by whether the first touch sensor 142 or the second touch sensor 144. For example, when the user contact is detected by the first touch sensor 142, the depth coordinate of the touch input can be a digit of "0"; on the other hands, when the user contact is detected by the second touch sensor 144, the depth coordinate of the touch input can be a digit of "1". However, the depth coordinate disclosed in the invention is not merely limited to this example.

As shown in FIG. 1, the display 120 is used for displaying a user interface.

Reference is made to FIG. 3, FIG. 4 and FIG. 5. FIG. 3 is a schematic diagram illustrating the user interface 122 according to an embodiment of the invention. To be noticed that, the user interface 122 disclosed in the invention has a plurality of interface layers. Each interface layer has a different layer-depth reference. As shown in FIG. 3, the user interface 122 includes two interface layers, i.e., a front interface layer 124 and a back interface layer 126. FIG. 4 is a schematic diagram illustrating the front interface layer 124 according to aforesaid embodiment of the invention. FIG. 5 is a schematic diagram illustrating the back interface layer 126 according to aforesaid embodiment of the invention.

There are several display items displayed on the user interface 122. For example, there are total twelve display items (display items 124a~124e and display items 126a~126g) on the user interface 122. Each display item is located on one of the interface layers. As shown in FIG. 4, five display items 124a~124e are located on the front interface layer 124. As shown in FIG. 5, seven display items 126a~126g are located on the back interface layer 126.

If some display items are from different interface layers are partially (or fully) overlapped, the display items are displayed in sequence of the layer-depth references of the interface layers. As shown in FIG. 3, the display item 124a on the front interface layer 124 partially covers the display item 126a on the back interface layer 126.

By applying of layer-depth reference in the embodiment, the user interface 122 with the characteristic of three-dimensional manipulating interface may accommodate more display items in a size-limited displaying area.

During the practical procedure of detecting the touch input and further reacting to the touch input, the processing unit 160 of the embodiment matches the depth coordinate of the touch input generated by the touch sensor module 140 with the layer-depth references of the interface layers (e.g., the front interface layer 124 and the back interface layer 126), and mapping the touch input onto the one of the interface layers according to the matching result.

The embodiments in following paragraphs are listed for demonstrating how to generate different depth coordinates depending on the characteristic of the touch input, and how to map the touch input onto proper interface layer according to the depth coordinate of the touch input. In the embodiment corresponding to FIG. 3 to FIG. 5, the touch sensor module 140 is disclosed to include two touch sensors (the first touch sensor 142 and the second touch sensor 144) for example.

When the first touch sensor 142 on the front side senses user manipulation and generates the touch input, the touch input is mapped onto the front interface layer 124, so as to select from the display items 124a~124e on the front interface layer 124 or launch an executive function corresponding to the display items 124a~124e on the front interface layer 124; on the other hand, when the second touch sensor 144 senses user manipulation and generates the touch input, the touch input is mapped onto the back interface layer 126, so as to select from the display items 126a~126g on the back interface layer 126 or launch an executive function corresponding to the display items 126a~126g on the back interface layer 126. In other words, when one of the touch sensors (either the first touch sensor 142 or the second touch sensor 144) senses the touch input, the depth coordinate is generated and the depth coordinate is varied according to that the touch input is sensed by which touch sensor of the touch sensors. Afterward, the processing unit 160 matches the depth coordinate of the touch input with the layer-depth references, the processing unit 160 maps the touch input onto the one of the interface layers according to the matching result. As the embodiment corresponding to FIG. 3 to FIG. 5, different touch sensors can be disposed on different locations (e.g., different surfaces of the apparatus).

In the embodiment, the first touch sensor 142 and the second touch sensor may adopt various kinds of touch sensors, e.g., the capacitive touch sensor, the resistive touch sensor, the optical touch sensor, the acoustic touch sensor or any equivalent touch sensor.

In a practical application, the first touch sensor 142 may adopt a capacitive touch sensor and the second touch sensor 144 may adopt an acoustic touch sensor. As shown in the embodiment of FIG. 1, the first touch sensor 142 adopting the capacitive touch sensor can be well integrated with the display module 120 on the front side, and furthermore the capacitive touch sensor may provide higher preciseness in touch sensing. On the other hand, the second touch sensor 144 adopting the acoustic touch sensor on the back side may work properly regardless of the hardware configuration in surrounding area. The acoustic touch sensor recognizes location of the touch input by the sound caused by the user contact, and the acoustic touch sensor may work properly without a smooth sensing plane. Therefore, the acoustic touch sensor may coexist with other kinds of hardware within the same area. For example, the acoustic touch sensor can be disposed around a battery module.

Furthermore, two touch sensors (the first touch sensor 142 or the second touch sensor 144) disposed on the front and back sides are utilized to generate the touch input with different depth coordinates. The depth coordinates corresponds to different interface layers (the front interface layer 124 or the back interface layer 126) on the user interface 122, such that a three-dimensional user interface 122 and a three-dimensional touch sensing method are realized. In this case, the depth coordinates can be determined by distinguishing which touch sensor generates the touch input. The identification of the depth coordinate is easy and precise. In addition, two touch sensors disposed on different sides of the apparatus are free of the interference from each other.

On the user interface 122 of the embodiment, users may directly click on the display items 126a~126g via the second touch sensor 144, such that a mistaken click on other display items on the front layer 124 can be avoided. For example, when users try to launch the photo-shooting function, users may click the display item 126b via the second touch sensor 144 on the back side, in stead of clicking on the front side in a traditional user interface, which may lead to a mistaken click on the display item 124b representing the phone-calling function. On the other hand, when users try to launch the phone-calling function, users may click the display item 124b via the first touch sensor 142 on the front side, so as to avoid a mistaken click on the nearby display item 126b representing the photo-shooting function.

In comparison, parts of traditional user interfaces manage display items with archive folders. In this case, users may not click the display item through the desktop screen, and users must remember the target display item is classified into which archive folder. In addition, some other traditional user interfaces distinguish the touch destination between the front display item and the back display item by singular-clicking or double-clicking. This kind of traditional manipulation manner with multiple-clicking is not friendly to users.

In aforesaid embodiment of the invention, the touch sensor module 140 of the portable electronic apparatus 100 includes the first touch sensor 142 disposed on the front side and the second touch sensor 144 disposed on the back side for generating a touch input with variable depth coordinate. However, the invention is not limited to two touch sensors on the opposite sides. In another embodiment, the touch sensor module 140 may include three or more touch sensors for generating a depth coordinate with more possible levels corresponding to more interface layers.

In another embodiment, two or more touch sensors of the touch sensor module 140 can be disposed on the same side. For example, the touch sensor module may include a capacitive touch sensor integrated with the display panel and an optical touch sensor disposed over the capacitive touch sensor. When a finger moves close to the top surface of the display panel, the optical touch sensor will be triggered at first. Secondly, when the finger contacts on the top surface of the display panel, the capacitive touch sensor will be triggered. Therefore, multiple touch sensors (the capacitive touch sensor and the optical touch sensor) disposed on the same side may generate a touch input with variable depth coordinate. In order words, the touch input may have different depth coordinate according to the vertical pressed amplitude of the user.

In another embodiment, two or more touch sensors on the same side can be a capacitive touch sensor and a resistive touch sensor. Different depth coordinate can be generated according as the finger contacts on the touch plane (capacitive sensing) or presses downward against the touch plane (resistive sensing). Therefore, multiple touch sensors (the capacitive touch sensor and the resistive touch sensor) disposed on the same side may generate a touch input with variable depth coordinate. In order words, the touch input may have different depth coordinate according to the vertical pressed amplitude of the user. The capacitive touch sensor and the resistive touch sensor are well known by a person in the art, and not to be discussed further here.

In another embodiment, the touch module 140 may include a touch sensor and a pressure sensor (or the pressure sensor can be a touch sensor capable sensing the pressure from the force of the touch contact, such as the resistive touch sensor). Different depth coordinate can be generated according as the pressed force from the touch contact. In order words, the touch input may have different depth coordinate according to the pressed force of the user.

Furthermore, the touch sensor module 140 may include at least one touch sensor. The at least one touch sensor can be a capacitive sensor. The touch input sensed by the capacitive touch sensor may have different signal strength when the contacted area between the finger and the capacitive touch sensor is different. The depth coordinate can be varied based on the signal strength of the touch input.

In aforesaid embodiments, the invention discloses a user interface 122 with multiple interface layers, and each interface layer has a layer-depth reference respectively, so as to form a three-dimensional user interface 122 for managing the display items 124a~126g. The touch input is mapped onto the display items 124a~126g on different interface layers according to the depth coordinate of the touch input and the layer-depth references of the interface layers. The depth coordinate can be generated in many ways at least including procedures mentioned in the embodiments from FIG. 1 to FIG. 5. However, the invention is not limited to those procedures.

Figure 6:
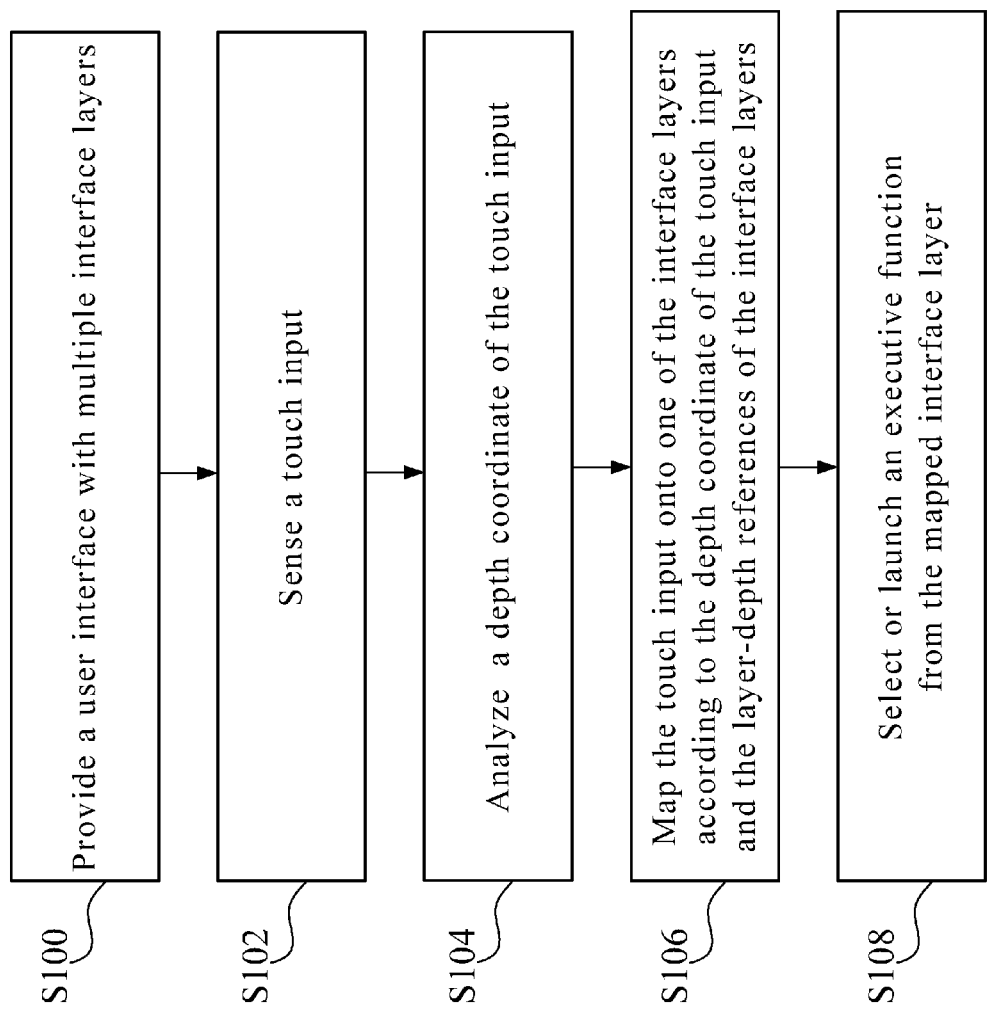
FIG. 6 is a flow chart diagram illustrating a touch sensing method according to an embodiment of the invention.

Reference is made to FIG. 6. FIG. 6 is a flow chart diagram illustrating a touch sensing method according to an embodiment of the invention. The touch sensing method of the embodiment can be applied on aforesaid portable electronic apparatus 100.

As shown in FIG. 6, step S100 of the touch sensing method is executed at first for providing a user interface. The user interface includes a plurality of interface layers. Each of the interface layers has a layer-depth reference respectively. Reference can be made to FIG. 3 to FIG. 5. According to an embodiment, the user interface includes a plurality of display items. Each display item is located on one of the interface layers. When at least part of the display items from different interface layers are overlapped, the display items are displayed in sequence of the layer-depth references of the interface layers The touch sensing method includes steps of: providing a user interface comprising a plurality of interface layers, each of the interface layers has a layer-depth reference respectively; sensing a touch input; and, mapping the touch input onto one of the interface layers according to the touch input and the layer-depth references of the interface layers, so as to select or launch an executive function from the one of the interface layers.

Afterward, step S102 is executed for sensing a touch input. During sensing the touch input, step S104 can be executed for analyzing the touch input and acquiring a depth coordinate of the touch input.

Afterward, step S106 is executed for mapping the touch input onto one of the interface layers according to the touch input and the layer-depth references of the interface layers. During step S106, the touch sensing method is further performed to match the depth coordinate of the touch input with the layer-depth references of the interface layers, so as to map the touch input onto the one of the interface layers according to the matching result. In addition, the touch input further has a horizontal coordinate and a vertical coordinate.

Finally, step S108 is executed for selecting or launching an executive function from the interface layer corresponding to the depth coordinate of the touch input. In addition, the targeted location of the display item on the corresponding layer can be referred to the horizontal coordinate and the vertical coordinate of the touch input.

In an embodiment, the portable electronic apparatus include a plurality of touch sensors. During sensing the touch input, the touch input is sensed by one of the touch sensors. When the touch sensing method generate a depth coordinate of the touch input, and the depth coordinate corresponds to the one of the touch sensors.

For example, the touch sensors may include a first touch sensor (e.g., a capacitive touch sensor, a resistive touch sensor, an optical touch sensor or an acoustic touch sensor) and a second touch sensor (e.g., an acoustic touch sensor). The interface layers may include a front interface layer and a back interface layer. During step S102 to step S108, if the first touch sensor senses user manipulation and generates the touch input, the touch input is mapped onto the front interface layer for selecting or executing an executive function from the front interface layer. On the other hand, if the second touch sensor senses user manipulation and generates the touch input, the touch input is mapped onto the back interface layer for selecting or executing an executive function from the back interface layer.

According to an embodiment of the disclosure, the portable electronic apparatus includes at least one touch sensor (e.g., a capacitive touch sensor). During step S102, the touch sensing method further includes a step of: analyzing the touch input, and accordingly generating a depth coordinate corresponding to the touch input. The depth coordinate may be related to the signal strength of the sensed signal generated by the touch sensor (i.e., the capacitive touch sensor).

The further details of how to generate the depth coordinate, how to relate the depth coordinate and the layer-depth references, and other features of the invention are disclosed in aforesaid embodiments, and not to be repeated here. Reference can be made to FIG. 1 to FIG. 5 and related paragraphs above.

In summary, this disclosure provides a touch sensing method and a portable electronic apparatus. The user interface provided by the portable electronic apparatus in the disclosure has multiple interface layers in the same screen. Multiple display items on the user interface may be distributed on different locations in two dimensions over the screen, and in the mean time, each display item belongs to one of the interface layers, such that a three-dimensional user interface is formed. When users trigger the touch sensor module to generate a touch input, a depth coordinate of the touch input can be analyzed in this disclosure. The touch input can be mapped onto one of the interface layer according to the depth coordinate. Therefore, the disclosure may provide user a succinct interface with more manipulation possibilities compared to traditional two-dimensional user interface.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch sensing method, wherein the touch sensing method is suitable for a portable electronic apparatus, the portable electronic apparatus comprises a plurality of touch sensors and the touch sensing method comprises:
   providing a user interface comprising a plurality of interface layers, each of the interface layers has a layer-depth reference respectively;
   sensing a touch input, wherein the step of sensing a touch input comprises:
   generating a depth coordinate when the touch input being sensed by one of the touch sensors, the depth coordinate being varied according to the touch input being sensed by different touch sensor of the touch sensors; and
   mapping the touch input onto one of the interface layers according to the touch input and the layer-depth references of the interface layers, so as to select or launch an executive function from the one of the interface layers, wherein, the step of mapping the touch input onto one of the interface layers comprises:
   matching the depth coordinate of the touch input with the layer-depth references of the interface layers, and mapping the touch input onto the one of the interface layers according to the matching result;
   wherein the touch sensors comprise a first touch sensor and a second touch sensor, the interface layers comprising a front interface layer and a back interface layer, when the first touch sensor senses user manipulation and generates the touch input, the touch input is mapped onto the front interface layer for selecting or executing an executive function from the front interface layer, and when the second touch sensor senses user manipulation and generates the touch input, the touch input is mapped onto the back interface layer for selecting or executing an executive function from the back interface layer.

2. The touch sensing method of claim 1, wherein the first touch sensor comprises a capacitive touch sensor, a resistive touch sensor, an optical touch sensor or an acoustic touch sensor.

3. The touch sensing method of claim 1, wherein the second touch sensor comprises an acoustic touch sensor.

4. The touch sensing method of claim 1, wherein the step of sensing a touch input further comprises:
   analyzing a pressed force, a vertical pressed amplitude or a signal strength from the touch input, and accordingly generating the depth coordinate corresponding to the touch input.

5. The touch sensing method of claim 4, wherein the at least one sensor comprises a capacitive touch sensor.

6. The touch sensing method of claim 1, wherein the touch input further has a horizontal coordinate and a vertical coordinate.

7. The touch sensing method of claim 1, wherein the user interface comprises a plurality of display items, each display item is located on one of the interface layers, when at least part of the display items from different interface layers are overlapped, the display items are displayed in sequence of the layer-depth references of the interface layers.

8. A portable electronic apparatus, comprising:
   a display module for displaying a user interface, the user interface comprising a plurality of interface layers, each of the interface layers having a layer-depth reference respectively;
   a touch sensor module for sensing a touch input; and
   a processing unit for mapping the touch input onto one of the interface layers according to the touch input and the layer-depth references of the interface layers, so as to select or launch an executive function from the one of the interface layers;
   wherein the touch sensor module comprises a plurality of touch sensors, a depth coordinate is generated when the touch input is sensed by one of the touch sensors, the depth coordinate is varied according to the touch input being sensed by different touch sensor of the touch sensors, the processing unit matches the depth coordinate of the touch input with the layer-depth references of the interface layers, and the processing unit maps the touch input onto the one of the interface layers according to the matching result;
   wherein the touch sensors comprise a first touch sensor and a second touch sensor, the interface layers comprising a front interface layer and a back interface layer, when the first touch sensor senses user manipulation and generates the touch input, the touch input is mapped onto the front interface layer for selecting or executing an executive function from the front interface layer, and when the second touch sensor senses user manipulation and generates the touch input, the touch input is mapped onto the back interface layer for selecting or executing an executive function from the back interface layer.

9. The portable electronic apparatus of claim 8, wherein the first touch sensor comprises a capacitive touch sensor, a resistive touch sensor, an optical touch sensor or an acoustic touch sensor.

10. The portable electronic apparatus of claim 8, wherein the second touch sensor comprises an acoustic touch sensor.

11. The portable electronic apparatus of claim 8, wherein the processing unit analyzes a pressed force, a vertical pressed amplitude or a signal strength from the touch input, accordingly the processing unit generates the depth coordinate corresponding to the touch input.

12. The portable electronic apparatus of claim 11, wherein the at least one touch sensor comprises a capacitive touch sensor.

13. The portable electronic apparatus of claim 8, wherein the touch input further has a horizontal coordinate and a vertical coordinate.

14. The portable electronic apparatus of claim 8, wherein the user interface comprises a plurality of display items, each display item is located on one of the interface layers, when at least part of the display items from different interface layers are overlapped, the portable electronic apparatus displays the display items in sequence of the layer-depth references of the interface layers.

15. A portable electronic apparatus, comprising:
a casing;
a display module for displaying a user interface, the user interface comprising a front interface layer and a back interface layer, wherein each of the front interface layer and the back interface layer has a layer-depth reference respectively;
a touch sensor module for sensing a touch input, the touch sensor module comprising a first touch sensor disposed on a front side of the casing and a second touch sensor disposed on a back side of the casing; and
a processing unit, when the first touch sensor sensing user manipulation and generating the touch input, the processing unit mapping the touch input onto the front interface layer for selecting or executing an executive function from the front interface layer, and when the second touch sensor sensing user manipulation and generating the touch input, the processing unit mapping the touch input onto the back interface layer for selecting or executing an executive function from the back interface layer;
wherein a depth coordinate is generated when the touch input is sensed by the first touch sensor or the second touch sensor, the depth coordinate is varied according to the touch input being sensed by the first touch sensor or the second touch sensor, the processing unit matches the depth coordinate of the touch input with the layer-depth references of the front interface layer and the back interface layer, and the processing unit maps the touch input onto the front interface layer or the back interface layer according to the matching result.

16. The portable electronic apparatus of claim 15, wherein the first touch sensor comprises a capacitive touch sensor, a resistive touch sensor, an optical touch sensor or an acoustic touch sensor, and the second touch sensor comprises an acoustic touch sensor.

* * * * *